United States Patent
Kasaiezadeh Mahabadi et al.

(10) Patent No.: US 10,266,202 B2
(45) Date of Patent: Apr. 23, 2019

(54) METHODS AND SYSTEMS FOR VEHICLE LATERAL FORCE CONTROL

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Bakhtiar B. Litkouhi, Washington, MI (US); Nikolai K. Moshchuk, Grosse Pointe, MI (US); Shih-Ken Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 15/486,086

(22) Filed: Apr. 12, 2017

(65) Prior Publication Data

US 2018/0297633 A1    Oct. 18, 2018

(51) Int. Cl.
*B62D 6/00* (2006.01)
*B62D 5/04* (2006.01)

(52) U.S. Cl.
CPC .............. *B62D 6/003* (2013.01); *B62D 6/007* (2013.01)

(58) Field of Classification Search
CPC ............................. B62D 5/0481; B62D 6/003
See application file for complete search history.

(56) References Cited

U.S. PATENT DOCUMENTS

| | | | |
|---|---|---|---|
| 6,816,804 B1 | 11/2004 | Lee | |
| 7,451,033 B2 | 11/2008 | Xu et al. | |
| 2002/0035871 A1* | 3/2002 | Pallot | B60T 8/1755 73/489 |
| 2004/0258154 A1 | 12/2004 | Liu et al. | |
| 2005/0187672 A1* | 8/2005 | Fangeat | B60T 8/17551 701/1 |
| 2008/0109133 A1* | 5/2008 | Bedner | B62D 6/002 701/41 |
| 2008/0109134 A1* | 5/2008 | Bolourchi | B62D 6/002 701/41 |
| 2011/0166744 A1* | 7/2011 | Lu | B60T 8/1755 701/29.2 |
| 2013/0144476 A1* | 6/2013 | Pinto | B60T 8/17555 701/22 |
| 2017/0057493 A1* | 3/2017 | Sato | B60W 30/02 |
| 2017/0057494 A1* | 3/2017 | Sato | B60W 10/08 |
| 2017/0369050 A1* | 12/2017 | Varnhagen | B60W 10/06 |

\* cited by examiner

*Primary Examiner* — Mussa A Shaawat
(74) *Attorney, Agent, or Firm* — Lorenz & Kopf, LLP

(57) ABSTRACT

Methods and system are provided for controlling a vehicle. The methods and systems read sensors and estimate pneumatic trail for a tire of the vehicle based on the sensor readings. The methods and systems determine presence or absence of a tire lateral saturation condition based on a comparison of the estimated pneumatic trail for the tire of the vehicle with a pneumatic trail threshold indicative of a tire lateral saturation condition. When the tire lateral saturation condition is present, the methods and systems determine a control value and use the control value as an input to a vehicle control module. The vehicle control module is responsive to the tire lateral saturation condition based on the control value.

18 Claims, 3 Drawing Sheets

METHODS AND SYSTEMS FOR VEHICLE LATERAL FORCE CONTROL

TECHNICAL FIELD

The technical field generally relates to determining tire lateral saturation conditions, and more particularly relates to controlling a vehicle based on a tire lateral saturation condition being present.

BACKGROUND

Lateral force control is implemented through any of a number of automatic vehicle control systems including electronic power steering systems (EPS), collision imminent systems (CIS), lane centering systems, electronic stability control (ESC) systems, comprehensive safety vehicle (CSV) systems, and vehicle lane change assist systems. Prevention of operating in an unstable region of the tire, when tire lateral force is excessive, allows for effective operation of such vehicle control systems.

Tire saturation or lateral force tire saturation is one parameter used as an indicator of lateral stability of a vehicle and is used in some vehicle control systems. Tire saturation refers to an unstable region, whereby a usually substantially linear relationship between tire lateral force and slip angle ceases and the tire exhibits a lack of responsiveness to further steering force. Tire slip angle is an angle between a rolling wheel's actual direction of travel (heading direction of the vehicle) and the direction towards which the wheel is pointing. Lateral (i.e., parallel to the wheel axle) force is a force produced by a vehicle tire during cornering and is linearly proportional to slip angle at low and moderate slip angles. However, as slip angle increases, lateral force peaks at a lateral tire saturation force, beyond which steering control is unstable. Some vehicle control systems operate to keep lateral force within a stable region of low and moderate slip angles.

Accordingly, the need exists for a system and method for determining lateral tire force saturation. In addition, it is desirable to provide such systems and methods without requiring parameters that are complex to estimate, such as road condition, and in a processing efficient scheme. Furthermore, other desirable features and characteristics of the present invention will become apparent from the subsequent detailed description and the appended claims, taken in conjunction with the accompanying drawings and the foregoing technical field and background.

SUMMARY

A computer implemented method for controlling a vehicle is provided. The method includes reading sensors and estimating pneumatic trail for a tire of the vehicle based on the sensor readings. The method includes determining presence or absence of a tire lateral saturation condition based on a comparison of the estimated pneumatic trail for the tire of the vehicle with a pneumatic trail threshold indicative of a tire lateral saturation condition. When the tire lateral saturation condition is present, determining a control value and using the control value as an input to a vehicle control module. The vehicle control module is responsive to the tire lateral saturation condition based on the control value.

In embodiments, the control module controls steering of the vehicle to move the estimated pneumatic trail relative to the pneumatic trail threshold so that absence of tire lateral saturation condition is determined.

In embodiments, the vehicle control module includes an electronic power steering system.

In embodiments, the vehicle control module determines steering control based on the control value.

In embodiments, the control value includes an electronic power steering correction to be applied to electronic power steering through the vehicle control module.

In embodiments, the control value is calculated as a magnitude reducing factor to steering torque.

In embodiments, the magnitude reducing factor is calculated as a function, e.g. proportion, of a difference between the estimated pneumatic trail for the tire of the vehicle and the pneumatic trail threshold.

In embodiments, no electronic power steering correction is applied to electronic power steering through the vehicle control module in the absence of the tire lateral saturation condition.

In additional or alternative embodiments, the control value includes a target slip angle for the vehicle control module.

In embodiments, the method includes estimating slip angle for a or the tire of the vehicle and, when the tire lateral saturation condition is present, using the estimated slip angle as the target slip angle.

In embodiments, slip angle is estimated based on mapping longitudinal and lateral velocity for the vehicle to the at least one tire, wherein longitudinal and lateral velocity is derived from the sensor readings, or estimation.

In embodiments, the method includes looping the reading, estimating and determining steps in the absence of the tire lateral saturation condition.

In embodiments, the method includes determining the presence or absence of the tire lateral saturation condition based on the comparison of the estimated pneumatic trail with a pneumatic trail threshold indicative of the tire lateral saturation condition and a persistence criterion.

In embodiments, the sensor readings include longitudinal or lateral acceleration of the vehicle, yaw rate, steering wheel angle, driver contribution to steering torque, electronic power system contribution to steering torque and/or longitudinal velocity of the vehicle.

In embodiments, the method includes estimating lateral velocity of the vehicle, self-aligning torque, estimating lateral force and estimating the pneumatic trail for the tire based on the estimated lateral force and the estimated self-aligning torque, particularly as a gradient of estimated lateral force and estimated self-aligning torque.

In embodiments, the self-aligning torque is calculated based on electronic power steering torque and steering wheel angle.

In embodiments, the lateral force is calculated based on lateral acceleration and yaw rate.

A vehicle is provided having a vehicle control system. The vehicle includes a sensing unit including sensors. A vehicle control module and a controller. The controller is configured to estimate pneumatic trail for a tire of the vehicle based on readings from the sensors. The vehicle control module is configured to determine presence or absence of a tire lateral saturation condition based on a comparison of the estimated pneumatic trail for the tire of the vehicle with a pneumatic trail threshold indicative of a tire lateral saturation condition. When the tire lateral saturation condition is present, the vehicle control module is configured to determine a control value. The vehicle control module is configured to use the control value as an input to the vehicle control module. The vehicle control module is responsive to the tire lateral saturation condition based on the control value.

In embodiments, the vehicle control module tends to bring the estimated pneumatic trail to a level relative to the threshold that does not result in a tire lateral saturation condition being determined.

In embodiments, the control value includes an electronic power steering correction and/or a target slip angle. The controller is configured to calculate the electronic power steering command correction as a magnitude reducing factor to steering torque. The magnitude reducing factor is, in one example, calculated as a function of, e.g. proportion of, a difference between the estimated pneumatic trail for the tire of the vehicle and the pneumatic trail threshold. The controller is configured to estimate slip angle for the tire of the vehicle. When the tire lateral saturation condition is present, the controller is configured to use the estimated slip angle as the target slip angle.

A system is provided for controlling a vehicle. The system includes a non-transitory computer readable medium including computer readable instructions, which when executed by a processor, are configured to cause the following steps to be performed. The steps include reading sensors and estimating pneumatic trail for a tire of the vehicle based on the sensor readings. The steps include determining presence or absence of a tire lateral saturation condition based on a comparison of the estimated pneumatic trail for the tire of the vehicle with a pneumatic trail threshold indicative of a tire lateral saturation condition. When the tire lateral saturation condition is present, the steps include determining a control value and using the control value as an input to a vehicle control module. The vehicle control module is responsive to the tire lateral saturation condition based on the control value.

The control value includes an electronic power steering correction and/or a target slip angle. The instructions, when executed by the processor, are configured to cause the following steps to be performed. The steps include calculating the electronic power steering correction as a magnitude reducing factor to steering torque. The magnitude reducing factor is calculated as a function, e.g. proportion, of a difference between the estimated pneumatic trail for the tire of the vehicle and the pneumatic trail threshold, for example. The steps include estimating slip angle for the tire of the vehicle. When the tire lateral saturation condition is present, using the estimated slip angle as the target slip angle.

DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background or the following detailed description As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
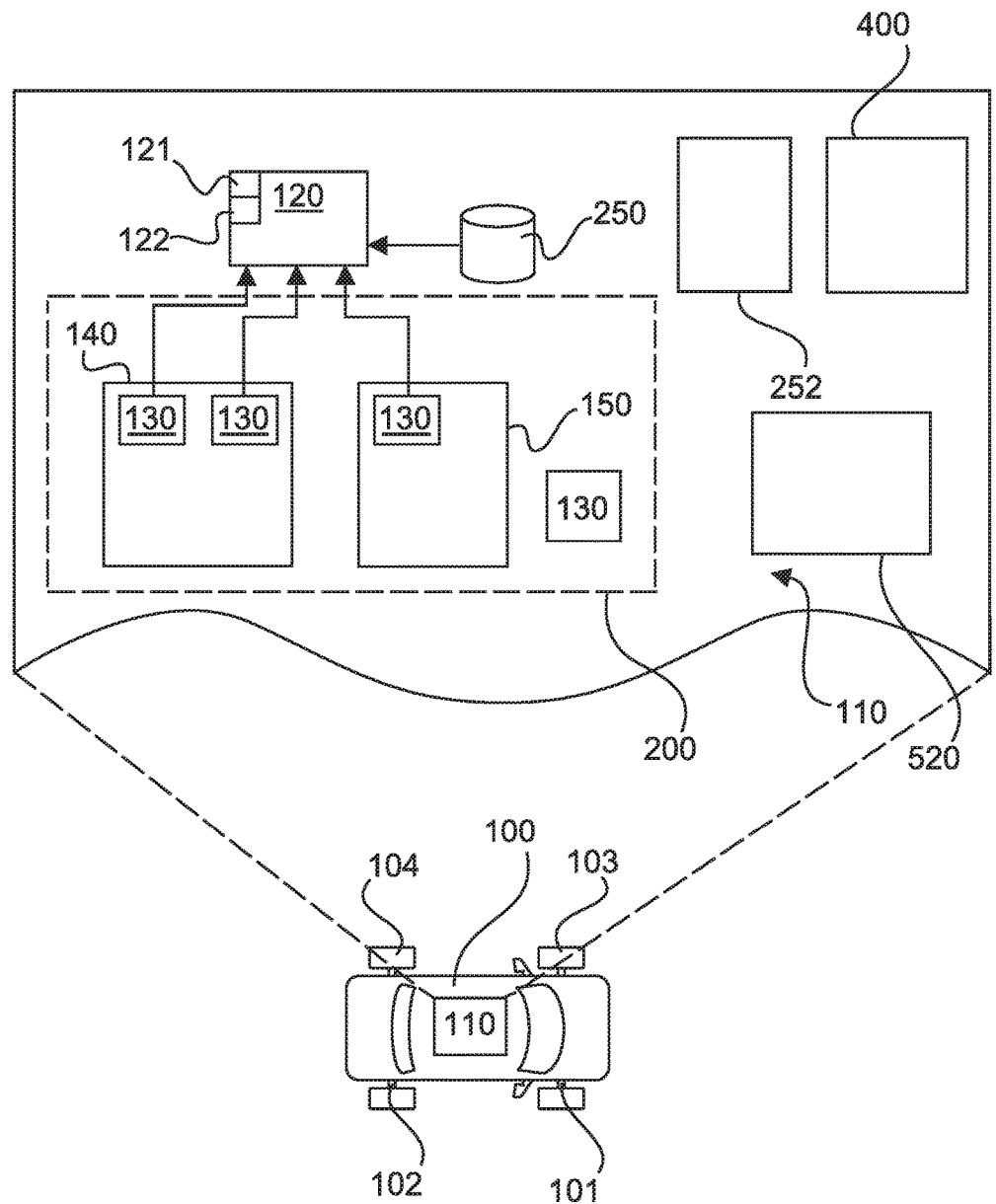
FIG. 1 is a functional block diagram of a vehicle having modules for determining lateral tire force saturation condition, in accordance with various embodiments.

With reference to FIG. 1, an exemplary vehicle 100 is shown that includes a control system 110, in accordance with exemplary embodiments. As can be appreciated, the vehicle 100 may be any vehicle type that could be subject to tire lateral force saturation, which is when steering becomes unstable as a result of a lack of responsiveness to steering force in changing vehicle heading direction. Lateral force tire saturation is identified in a graph of lateral force versus slip angle in a non-linear region as lateral force peaks. The slip angle is an angle between the direction of vehicle heading and the direction of a tire. Although the figures shown herein depict an example with certain arrangements of elements, additional intervening elements, devices, features, or components may be present in actual embodiments. It should also be understood that FIG. 1 is merely illustrative and is not be drawn to scale.

In an exemplary embodiment, the vehicle 100 includes a front axle 101 having front wheels 103 thereon and a rear axle 102 having rear wheels 104 thereon. The skilled reader will appreciate that the axles 101, 102 are shown in exaggerated protruding form purely for the purposes of illustration.

The control system 110 includes a control module 120 that receives inputs from one or more sensors 130 of the vehicle 100. The sensors 130 sense observable conditions of the vehicle 100 and generate sensor signals based thereon. For example, the sensors 130 include electric power steering (EPS) system sensors 140, inertial measurement unit sensors 150, and/or other sensors 130 and generate sensor signals based thereon. The sensors 130 are included in a sensor system 200 in the exemplary embodiment. The sensors 130 sense one or more of the following vehicle parameters and generate corresponding control signals: lateral acceleration, longitudinal acceleration, yaw rate, EPS torque, steering angle, etc. In various embodiments, the sensors 130 communicate the signals directly to the control module 120 and/or may communicate the signals to other control modules (not shown) which, in turn, communicate data from the signals to the control module 120 over a communication bus (not shown) or other communication means.

In exemplary embodiments, the control system 110 further includes a non-volatile memory 250 storing various look-up parameters as described further herein. The control system 110 includes an instrument panel 252 that provides an interface with a driver to receive inputs from the driver and to provide outputs to the driver. The instrument panel 252 may include a display, such as indicator lights and/or a graphical user interface, through which outputs can be made.

In exemplary embodiments, the control system 110 includes an actuator system 400 that includes one or more actuator devices (not shown) that control one or more vehicle features such as, but not limited to, a propulsion system, a transmission system, a steering system, and a brake system. In various embodiments, the vehicle features can further include interior and/or exterior vehicle features such as, but are not limited to, doors, a trunk, and cabin features such as air, music, lighting, etc. (not numbered).

In exemplary embodiments, the control system 110 includes am automated vehicle control system 520 such as, or including, an electronic power steering system (EPS), a collision imminent systems (CIS), a lane centering systems, an electronic stability control (ESC) system, a comprehensive safety vehicle (CSV) system, and a vehicle lane change assist systems. The control system 110 is configured to receive and process signals from the sensor system 200 and the control module 120 and to perform logic, calculations, methods and/or algorithms for automatically controlling components of the vehicle 100 through control signals to various actuators of the actuator system 400 to automatically control the components of the vehicle 100 based on the logic, calculations, methods, and/or algorithms.

In an exemplary embodiment, the vehicle 100 is any one of so-called Levels One to Five automation system and the vehicle control system 110 is configured accordingly.

The control module 120 receives the signals and/or the data captured by the sensors 130n and estimates pneumatic trail for one or more tires 103, 104 of the vehicle using the sensed signals. The control module 120 determines determining presence or absence of a tire lateral saturation condition based on a comparison of the estimated pneumatic trail for the one or more tires of the vehicle 100 with a pneumatic trail threshold indicative of a tire lateral saturation condition. In an embodiment, the threshold is selected to correspond with onset of a non-linear region in a relationship of lateral tire force and slip angle. That is, the tire lateral saturation condition corresponds to approach or imminent steering instability due to tire lateral force saturation. The control module 120 then responds to the presence of tire lateral force saturation to determine at least one control value for controlling one or more features of the vehicle 100 through the automated vehicle control system 520 and the actuator system 400, as described further below. The control value and the control system are configured to execute corrective measures to bring the vehicle back into a stable condition, i.e. a condition in which tire lateral saturation is absent.

The control module 120 of FIG. 1 (and the various sub-modules included therein as described below with respect to FIG. 2) may be implemented by a combination of at least one computer program 121 (computer readable instructions) executed on at least one processor 122 of the vehicle 100. The processor 122 may alternatively be termed a controller herein.

The estimated pneumatic trail may provide an early indication of lateral tire saturation and thus may allow automated vehicle control system to take pre-emptive and early corrective measures to restore tire stability. That is, the estimated pneumatic trail correlates tire self-aligning toque (SAT) and tire lateral force and is able to provide a preemptive warning of tire force saturation, which is a likely precursor to vehicle steering instability. The systems and methods disclosed herein set a threshold for estimated pneumatic trail at which point certain control parameters are generated to allow corrective measures to be taken through automated vehicle control system. Further, by using pneumatic trail as described herein, the control parameters are generated without requiring knowledge of road condition.

When tire force is saturated, the limits of the tire/road capacity have likely been reached. Any force requested beyond that limit will potentially result in vehicle instability and result in corrective measures being taken. Tire force saturation is indicated by tire SAT and tire lateral force and thus also by pneumatic trail. An interesting characteristic of SAT is that it shows tire force saturation before the lateral forces are saturated. The control module 120 is able to take the advantage of this SAT characteristic, through the estimated pneumatic trail, to provide an early indication of vehicle instability, which allows subsequent steps to be taken through an automated vehicle control system 520, such as taking automated EPS or other steering and/or propulsion and/or braking countermeasures. In particular, a determination of a tire lateral saturation condition instigates setting of a corrective control value such as target slip angle and/or steering correction.

Figure 2:
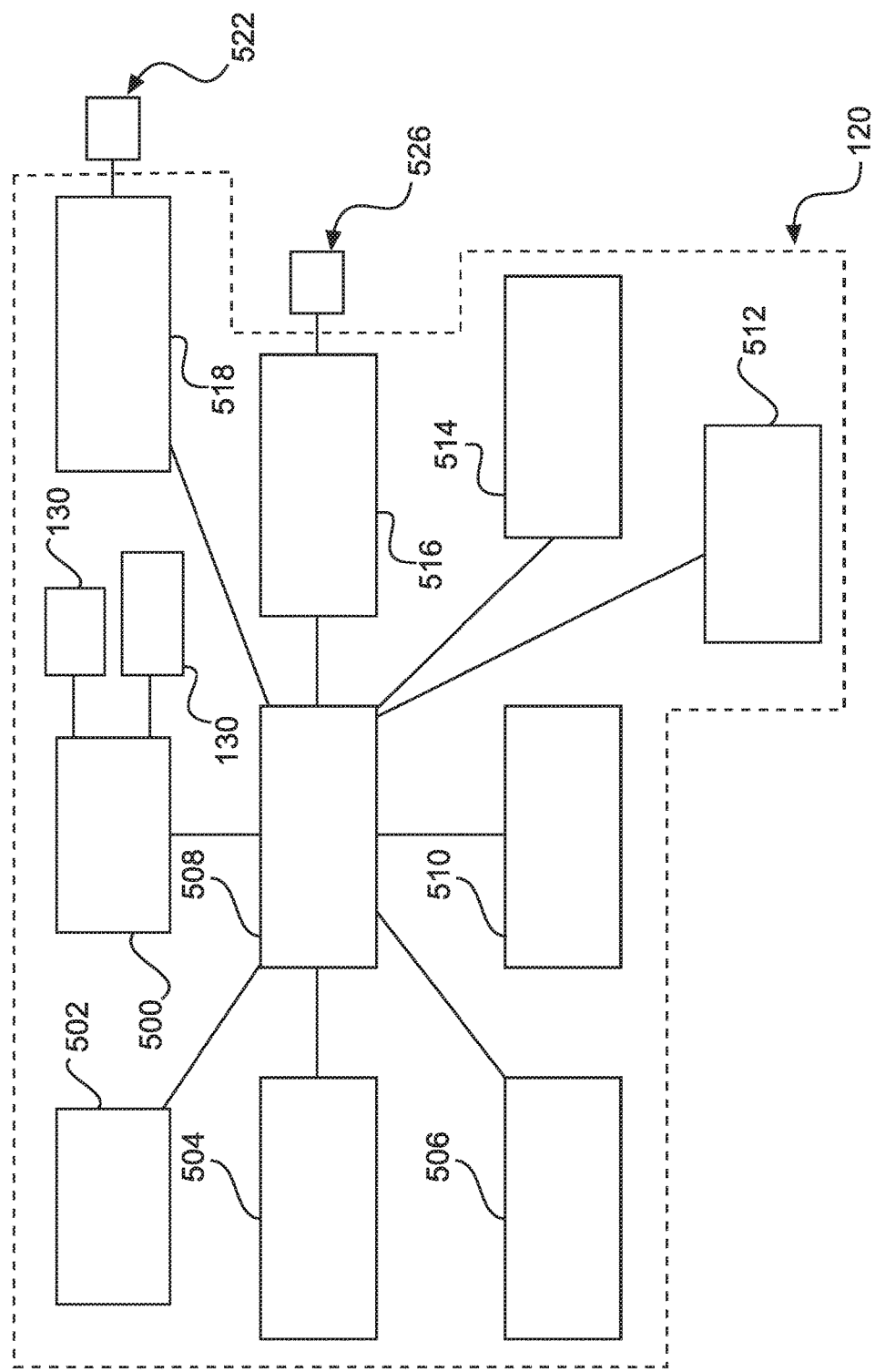
FIG. 2 is a diagram of exemplary modules for determining lateral tire force saturation condition, in accordance with various embodiments.

Referring now to FIG. 2, and with continued reference to FIG. 1, a diagram illustrates sub-modules included in the control module 120 in accordance with various exemplary embodiments. In various exemplary embodiments, the sub-modules shown in FIG. 2 may be combined and/or further partitioned to similarly determine a tire lateral force saturation condition and to control one or more components of the vehicle 100 based thereon. In various embodiments, the control module 120 includes a sensor module 500, an SAT estimation module 502, a tire saturation determination module 504, a lateral force estimation module 506, a central processing module 508, a threshold module 510, a pneumatic trail estimation module 512, a tire slip angle estimation module 514, a steering correction calculation module 516, a rear axle slip angle estimation module 518 and an automated vehicle control system 520, which is also a vehicle control module herein.

Figure 3:
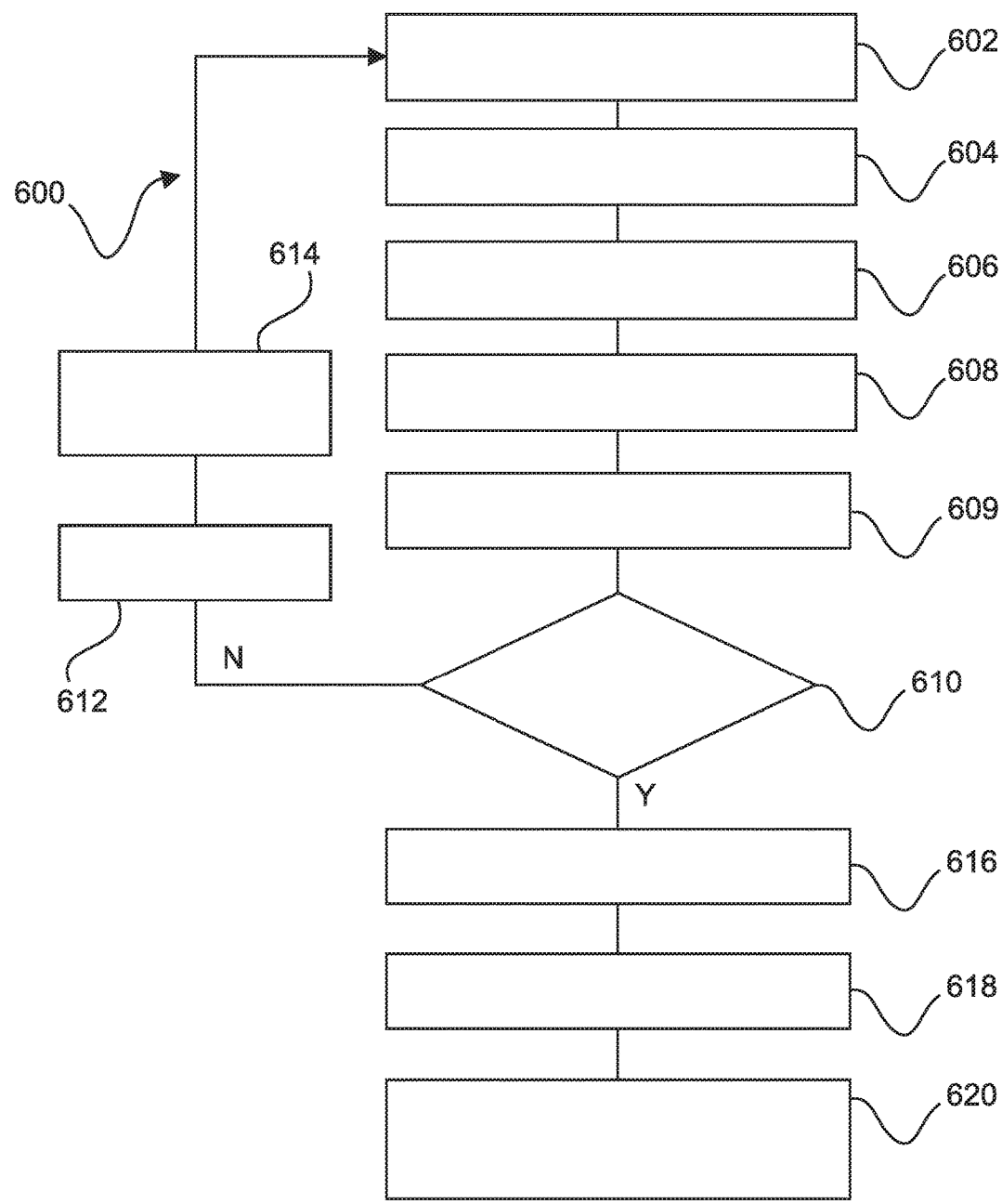
FIG. 3 is a flowchart illustrating a processing method for determining lateral tire force saturation condition, in accordance with various embodiments.

The central processing module 508 provides high level control and communication between the various modules. In particular, collaboration of results of the various modules, as explained in overview with respect to the flow chart of FIG. 3 is executed using the central processing module 508.

The sensor module 500 receives, as input, sensed parameters from the EPS and/or the IMU and/or other sensors 130. For example, the sensed parameters include, but are not limited to, steering torque applied by a drive (in non fully automated embodiments, electronic power system torque, steering angle, which are sensed through EPS sensors 140 or determined indirectly from other sensed values, yaw rate, lateral speed, longitudinal speed, lateral acceleration and longitudinal acceleration and that are sensed through the vehicle IMU 150 or determined indirectly from other sensors 130.

The pneumatic trail estimation module 512 estimates pneumatic trail based on sensed lateral acceleration, yaw rate, steering angle and EPS torque. These sensed values are readily available from sensors 130 of the IMU and the EPS. For example, the pneumatic trail estimation module 512 estimates pneumatic trail based on a ratio of self-aligning torque, SAT, and lateral force. The pneumatic trail estimation module 512 is, in embodiments, configured to estimate pneumatic trail using a moving averaging function such as regressive least squares fit with forgetting factor so that a current set of sensed readings and previous sensed readings are taken into account. Tire or axle lateral force is determinable based on lateral acceleration and yaw rate and SAT is determinable based on electronic power steering torque and steering angle in known ways. SAT and axle lateral force are able to be combined to estimate pneumatic trail based on a known relationship (described further below) between pneumatic trail, tire lateral force and SAT.

The axle lateral force estimation module 506 estimates lateral axle force for the front tires and/or the rear tires, for example based on sensed lateral acceleration and yaw rates from the sensors 130. The pneumatic trail estimation module 512 estimates pneumatic trail using at least the estimated lateral force. The axle lateral force for a front axle 101 is, in one embodiment, calculated based on the following equation:

$$F_{yf} = Ma_y - \frac{L_f M a_y - I\dot{r}}{L} \quad \text{(equation 1)}$$

In equation 1, $F_{yf}$ represents front axle lateral force, $L_f$ represents the distance from the vehicle center of gravity to the front axle 101, I is the yaw moment of inertia, M is the vehicle mass, $\dot{r}$ is the estimated rate of change of yaw rate with respect to time and L is the length of wheel base (the distance between the front and rear axles 101, 102). The parameters of equation 1 include values obtainable from the sensor 130 embodied in the IMU, specifically estimated yaw rate and axle lateral force, or are otherwise vehicle constants stored in memory 250. As the sensed yaw rate is usually an almost clean signal, r can be estimated accurately enough based on r from the sensors 130 of the IMU. Other algorithms and equations than that of equation 1 for determining axle lateral force are possible.

The axle lateral force for a rear axle 101 is, in one embodiment, calculated based on the following equation:

$$F_{yr} = \frac{L_r M a_y - I\dot{r}}{L} \quad \text{(equation 2)}$$

The SAT estimation module 502 estimates tire SAT, for example based on sensed EPS torque from the sensors 130 (via the sensor module 500). The pneumatic trail estimation module 512 estimates pneumatic trail using at least the SAT from the SAT estimation module 502. The SAT may be estimated using known algorithms such as that disclosed in U.S. Pat. No. 8,634,986, which document, particularly the portion concerned with estimating SAT based on sensed EPS torque, is hereby incorporated by reference. Such an algorithm estimates SAT based on sensed driver torque and electronic power system assist torque, steering angle obtainable from sensors 130 and gain parameters obtainable from memory 250.

The pneumatic trail estimation module 512 estimates pneumatic trail using the SAT from the SAT estimation module 502 and the axle lateral force estimation module 506. The pneumatic trail estimation module 512 determines a relationship between the estimated SAT and the lateral axle force and estimates the pneumatic trail using the relationship. For example, the relationship may be a rate of change of the estimated SAT with respect to the estimated lateral axle force, i.e. a ratio therebetween.

In a particular embodiment, the pneumatic trail estimation module 512 estimates pneumatic trail using the following equation:

$$\tau_a = \hat{F}_y * \frac{(t_m(\delta) + \hat{t}_p)}{\Gamma_f} \quad \text{(equation 3)}$$

In equation 2, $t_m$ represents mechanical trail (which is a function of steering angle $\delta$), $\hat{t}_p$ represents estimation of pneumatic trail, $\Gamma_f$ represents total trail, $\tau_a$ represents SAT and $\hat{F}_y$ represents an estimate of axle lateral force. In various embodiments, equation 2 is utilized on a tire by tire basis or on an axle by axle basis. SAT and front axle lateral force is determined as described above from the SAT estimation module 502 and the axle lateral force estimation module 506. Based on these estimated values, the total trail can be determined. Since mechanical trail does not vary greatly, total trail is used to estimate pneumatic trail. That is, mechanical trail is able to be recalled from memory 250. Total trail in equation 2 represents a relationship between SAT and axle lateral force, namely the rate of change or slope of SAT with respect to axle lateral force.

In various embodiments, the pneumatic trail estimation module 512 uses a Kalman filter, a least squares method (e.g. a recursive least squares method), or other averaging or filtration based algorithms to determine the slope between estimate SAT values and estimated axle lateral force values, thereby to estimate pneumatic trail. One example for real time estimation of pneumatic trail, $\hat{t}_p$, is a recursive least squares method with forgetting factor, as known to the skilled person.

From equation 3, it can be understood that the pneumatic trail may be comprised in total trail (which is a combination of mechanical trail and pneumatic trail), which is obtained from the slope determined by the pneumatic trail estimation module 512. Accordingly, total trail may be used by the control module 120 in determining the tire saturation condition. Alternatively, the pneumatic trail is estimated separately from total trail by applying a correction factor to total trail, as determined from the slope, to compensate for (e.g. subtract) mechanical trail.

In embodiments, the control module 120 includes a threshold module 510. The threshold module 510 retrieves from memory 250 a pneumatic trail threshold or retrieves parameters from memory 250 allowing calculation of the pneumatic trail threshold. The threshold module 510 generates the pneumatic trail threshold for use by tire saturation determination module 504. The pneumatic trail threshold is selected to represent approaching or onset of tire saturation. In exemplary embodiments, the pneumatic trail threshold is set at between 0.2 to 0.4 such as about 0.3. In embodiments, the threshold module 510 is adapted to tune the pneumatic trail threshold to accurately represent onset or approaching tire lateral force saturation.

In various embodiments, the tire saturation determination module 504 determines a state of lateral tire saturation based on the estimated pneumatic trail from the pneumatic trail estimation module 512 and the pneumatic trail threshold from the threshold module 510. The tire saturation determination module 504 determines presence or absence of lateral tire force saturation based on a comparison of the estimated pneumatic trail and the pneumatic trail threshold. When the estimated pneumatic trail is greater than the threshold therefor, a determination of presence of lateral tire force saturation is made. When the estimated pneumatic trail is less than the threshold therefor, a determination of absence of lateral tire force saturation is made. In various embodiments, the tire saturation determination module 504 determines tire lateral saturation for each axle 101, 102 or each tire 103, 104. In the event that either axle or any tire has estimated pneumatic trail surpassing the threshold, then tire saturation determination module 504 returns an output indicating presence of lateral tire force saturation.

In embodiments, the tire saturation determination module 504 implements a persistence criterion so that estimated pneumatic trail surpasses the threshold for a certain amount of time or a certain number of processing cycles. The persistence criterion is retrieved from memory 250 in some embodiments.

In various embodiments, the control module includes a steering correction calculation module 518. The steering correction calculation module 518 is configured to calculate a steering correction 528, specifically a steering torque reducing factor, so that the automated vehicle control system 520, through the actuator system 400, works with reduced steering torque. This feature of the present disclosure allows for the vehicle 100 to come out of lateral tire force saturation condition and also allows for mitigation of adverse consequences of vehicle instability caused by the lateral tire force saturation condition. In one embodiment, steering torque is applied through an electronic power steering system of the vehicle control system 520. In embodiments, the steering torque is reduced by a factor that is determined, at least in part, based on a difference between the estimated pneumatic trail and the pneumatic trail threshold. For example, the following equation is used by the steering correction calculation module 518:

$$E\_(G\_t) = K\_(p\_t) * (t\_cd - t\_c) * \text{sign}(M\_\text{driver} + M\_\text{EPS}) \quad \text{(equation 4)}$$

t_cd and t_c are estimated pneumatic trail and pneumatic trail threshold, respectively. In embodiments, total trail is used instead of pneumatic trail, which includes pneumatic trail. E_(G_t) is a torque correction or magnitude reducing factor that should be subtracted from a regular electronic power steering command used in any control application of the automated vehicle control system 520. M_driver and M_EPS represent driver steering torque (which is not present in some automated vehicle implementations) and steering assist torque applied through the electronic power steering system.

In the absence of tire lateral force saturation condition, steering commands and torque will be determined through regular algorithms of the automated vehicle control system 520 without the correction 528. As such, the electronic power steering system will run without a torque reducing factor 528 determined by the steering correction calculation module 518. The steering correction determined by the steering correction calculation module 518 biases electronically applied steering torque so as to return the vehicle 100 to a stable condition with respect to lateral tire force saturation when the pneumatic trail threshold has been breached.

In embodiments, the control module 120 includes a tire slip angle estimation module 514 configured to estimate tire slip angle 514 for each tire 103, 104. Tire slip angle can be estimated according to a variety of known schemes. In one embodiment, the tire slip angle estimation module 516 is configured to map longitudinal and lateral velocity as measured in the sensor system 200 to each tire. For example, the tire slip angle estimation module is configured to estimate tire slip angle using value obtained through sensor system 200 including lateral velocity, longitudinal velocity, yaw rate. The following equations are known for front axle and rear axle slip angle estimation:

$$\alpha_f = \delta - \frac{v_y + ar}{u} \quad \text{(equation 5)}$$

$$\alpha_r = -\frac{v_y - br}{u} \quad \text{(equation 6)}$$

where $\delta$ represents steering angle, r is yaw rate, $v_y$ is lateral velocity, a and b are constants and u is the longitudinal velocity, all of which can be obtained from the sensors 130 (via the sensor module 500). a and b are approximately equal to $L_f$ and $L_r$ as defined previously herein. In other embodiments, longitudinal and/or lateral velocity are estimate from an estimation sub-module of the sensor module rather than directly sensed.

In embodiments, the control module 120 includes a target tire slip angle setting module 516. Target tire slip angle is a parameter used in vehicle control systems in automated control of vehicle features, such as steering control. In particular, steering control commands are generated in an attempt to bring measured tire slip angle of the vehicle 100 into alignment with the target tire slip angle. The target tire slip angle setting module 516 is responsive to the tire saturation determination module 504 determining tire lateral force saturation condition. When presence of tire lateral saturation condition is determined, a most recent estimated tire slip angle from the tire slip angle estimation module is used by the target slip angle estimation module either directly, or is used in formulating, the target tire slip angle.

In embodiments, the central processing module 508 is configured to iterate various features of the system for each new set of sensed values from the sensor system 200 and received by the sensor module 500. That is, the lateral force estimation module 506 is configured to iteratively estimate lateral force. The SAT estimation module 502 is configured to iteratively estimate self-aligning torque. The pneumatic trail estimation module 512 is configured to iteratively estimate pneumatic trail. The tire slip angle estimation module 514 is configured to iteratively estimate tire slip angle. The tire saturation determination module 504 is configured to iteratively determine absence or presence of tire lateral saturation condition. When positive determination occurs, the target slip angle setting module 516 is configured to set the target slip angle 526 and the steering correction calculation module 518 is configured to determine the steering correction 522. The target slip angle and the steering correction 522 is iteratively determined for as long as presence of tire lateral force condition persists. When absence of tire lateral for condition is determined, i.e. tire lateral force saturation has been corrected, the target slip angle 526 is reset and steering correction estimation through the steering correction calculation module 518 ceases.

In embodiments, the automated vehicle control system 520 is configured to use the target slip angle 526 and the steering correction 522 in controlling vehicle features, particularly steering. Accordingly, the automated vehicle control system 520 includes an electronic power steering system that is responsive to the target slip angle 526 by generating steering control commands that tend to bring vehicle tire slip angle into alignment with the target 526, thereby tending to correct tire lateral force saturation condition. The automated vehicle control system 520 is configured to use the steering correction 522 to reduce steering torque command, e.g. electronic power system steering torque, determined by a steering control algorithm.

With reference now to FIG. 3, and with continued reference to FIGS. 1-2, a flowchart is shown of method 600 for determining tire lateral saturation condition and controlling a vehicle 100 based thereon in order to exit or correct the tire lateral saturation condition, in accordance with various embodiments. The method 600 is implemented in connection with the vehicle 100 of FIG. 1 and is performed by the control module 120 of FIG. 1, in accordance with various exemplary embodiments. As can be appreciated in light of the disclosure, the order of operation within the method is not limited to the sequential execution as illustrated in FIG. 3, but may be performed in one or more varying orders as applicable and in accordance with the present disclosure. As can further be appreciated, the method of FIG. 3 is scheduled to run at predetermined time intervals during operation of the vehicle 100 and/or may be scheduled to run based on predetermined events.

At step 602, sensed signals from at least one of the IMU sensors 130, EPS sensor 140 and/or other sensors 130 are received by the sensor module 500. The sensor module 500 processes the signals as necessary for use by other modules, in embodiments. In particular, the following sensed variables are received and processed by the sensor module 500: yaw rate, longitudinal and lateral acceleration, steering wheel angle and electronic applied steering torque (and optionally driver applied steering torque). The sensor module 500 is configured to estimate longitudinal and lateral velocity based on sensed readings.

At step 604, the lateral force is estimated by the lateral force estimation module 506 for each axle 101, 102, which corresponds to each tire 103,104. The lateral force is, in embodiments, estimated based on lateral acceleration and yaw rate signals from the sensor module 500 using equation 1 above.

At step 606, SAT is estimated by the SAT estimation module 502 for at least one of the tires 103, 104 using a known algorithm as described above. The algorithm requires electronically applied steering torque and steering angle from the sensor module 500, in accordance with various embodiments.

At step 608, pneumatic trail is estimated by determining a rate of change of lateral force with respect to SAT using the pneumatic trail estimation module 512. The pneumatic trail estimation module 512 estimates the rate of change using a suitable slope estimation algorithm such as a recursive least squares fit with forgetting factor, as described above. The pneumatic trail is separately determined and used in subsequent steps for determining lateral force saturation conditions, or it is enveloped in total trail, which is used as representative of pneumatic trail in the subsequent steps, or pneumatic trail is isolated based on a correction applied to total trail, as has been described above.

At step 609, slip angle is estimated based on yaw rate, longitudinal and lateral velocity and steering angle readings/estimations obtained from sensor system 200 and sensor module 500.

At step 610, a determination of presence or absence of tire lateral force saturation condition is made. In embodiments, step 610 entails determining whether estimated pneumatic trail is less than the pneumatic trail threshold, thereby indicating onset of, or imminently approaching, tire lateral saturation condition. Step 610 includes a check that persistence criterion has been met to ensure stability of estimated pneumatic trail falling below the pneumatic threshold.

When presence of tire lateral saturation condition is determined in step 610, steps 616, 618 and 620 are executed, in accordance with the exemplary embodiment. In step 616, the target tire slip angle 526 is set based on the estimated tire slip angle from step 609 using the target slip angle estimation module 516. In step 618, a steering correction 522 is generated as described above by which steering torque applied by the electronic power steering system is reduced by a factor proportional to a difference between the estimated pneumatic trail from step 608 and the pneumatic trail threshold, as one possible example. Step 618 is carried out through steering correction calculation module 518.

In step 620, the target slip angle 526 and the steering correction 522 are used in automated vehicle control system 520. By setting the target tire slip angle 526 as the estimated tire slip angle at the onset of tire lateral force saturation condition, steering control will tend towards a stable value with respect to tire slip angle. Further, by reducing electronic steering torque that is applied by way of the steering correction 522, automated vehicle control will also tend towards stabilization. In this way, the target tire slip angle 526 and the steering correction 522 biases the automated vehicle control system, e.g. electronic power steering system, to bringing the vehicle 100 out of the tire lateral force saturation condition, thereby assisting in stable vehicle control.

The process returns from the steps 616 and 618 of setting the target slip angle 526 and generating steering correction 522 to the start of the method 600 so that a new set of sensor readings are used in assessing whether tire lateral saturation condition remains. If so, target slip angle 526 and steering correction 522 are generated as before, which aims to bring the vehicle out of the tire lateral force saturation condition.

When absence of tire lateral saturation condition is determined in step 610, the process returns to the starting step 602, optionally after waiting a delay time for the next set of sensor readings or sampled data in step 612. Further, the target slip angle 526 is reset to an initialization value and the steering correction 522 is zeroed or otherwise wholly negated. For as long as the tire lateral saturation condition is avoided, automated vehicle control system operates conventionally without introduction of target slip angle 526 and steering correction 522 determined according to steps 616 and 618.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A computer implemented method for controlling a vehicle, the method comprising:
reading a plurality of sensors of the vehicle to obtain sensor data;
estimating a lateral force for at least one tire of the vehicle based on the sensor data;
estimating a self-aligning torque for the at least one tire based on the sensor data;
estimating a pneumatic trail for the at least one tire based on a rate of change of the lateral force with respect to the self-aligning torque for the at least one tire;
determining presence or absence of a tire lateral saturation condition based on a comparison of the estimated pneumatic trail for the at least one tire of the vehicle with a pneumatic trail threshold indicative of a tire lateral saturation condition;
when the tire lateral saturation condition is present, as determined by the comparison of the estimated pneumatic trail with the pneumatic trail threshold, determining at least one control value;
using the at least one control value as an input to a vehicle control module, wherein the vehicle control module is responsive to the tire lateral saturation condition based on the at least one control value; and
controlling steering for the vehicle based on the at least one control value via a processor, when the tire lateral saturation condition is present, as determined by the comparison of the estimated pneumatic trail with the pneumatic trail threshold.

2. The computer implemented method of claim 1, wherein the vehicle control module comprises an electronic power steering system, and the step of controlling steering for the vehicle comprises controlling steering for the vehicle, when the tire lateral saturation condition is present, by applying steering torque in a reduced amount through the electronic power steering system, wherein the reduced amount represents steering torque that is reduced by a factor that is determined based at least in part on a difference between the estimated pneumatic trail and the pneumatic trail threshold.

3. The computer implemented method of claim 1, wherein the vehicle control module determines steering control based on the at least one control value.

4. The computer implemented method of claim 1, wherein the at least one control value comprises an electronic power steering correction to be applied to electronic power steering through the vehicle control module.

5. The computer implemented method of claim 4, wherein no electronic power steering correction is applied to electronic power steering through the vehicle control module in the absence of the tire lateral saturation condition.

6. The computer implemented method of claim 1, wherein the at least one control value comprises a target slip angle for the vehicle control module.

7. The computer implemented method of claim 6, comprising estimating slip angle for at least one tire of the vehicle and, when the tire lateral saturation condition is present, using the estimated slip angle as the target slip angle.

8. The computer implemented method of claim 7, wherein slip angle is estimated based on mapping longitudinal and lateral velocity for the vehicle to the at least one tire, wherein longitudinal and lateral velocity is derived from the sensor readings, or otherwise estimated.

9. The computer implemented method of claim 1, comprising looping the reading, estimating and determining steps in the absence of the tire lateral saturation condition.

10. The computer implemented method of claim 1, wherein determining the presence or absence of the tire lateral saturation condition is based on the comparison of the estimated pneumatic trail with a pneumatic trail threshold indicative of the tire lateral saturation condition and a persistence criterion.

11. The computer implemented method of claim 1, wherein the sensor readings comprise at least one of, longitudinal or lateral acceleration of the vehicle, yaw rate, steering wheel angle, driver contribution to steering torque, electronic power system contribution to steering torque and longitudinal velocity of the vehicle.

12. The computer implemented method of claim 1, comprising estimating self-aligning torque, estimating lateral force and estimating the pneumatic trail for the at least one tire based on the estimated lateral force and the estimated self-aligning torque.

13. The computer implemented method of claim 11, wherein the self-aligning torque is calculated based on electronic power steering torque and steering wheel angle.

14. The computer implemented method of claim 11, wherein the lateral force is calculated based on lateral acceleration and yaw rate.

15. A vehicle, comprising:
a sensing unit comprising sensors configured to generate sensor data pertaining to the vehicle;
a vehicle control module; and
a controller configured to:
estimate a lateral force for at least one tire of the vehicle based on the sensor data;
estimate a self-aligning torque for the at least one tire based on the sensor data
estimate a pneumatic trail for the at least one tire based on a rate of change of the lateral force with respect to the self-aligning torque for the at least one tire;
determine presence or absence of a tire lateral saturation condition based on a comparison of the estimated pneumatic trail for the at least one tire of the vehicle with a pneumatic trail threshold indicative of a tire lateral saturation condition;
when the tire lateral saturation condition is present, determine at least one control value;
use the at least one control value as an input to the vehicle control module, wherein the vehicle control module is responsive to the tire lateral saturation condition based on the at least one control value; and
control steering for the vehicle based on the at least one control value via a processor, when the tire lateral saturation condition is present, as determined by the comparison of the estimated pneumatic trail with the pneumatic trail threshold.

16. The vehicle of claim 15, wherein the at least one control value comprises an electronic power steering correction and a target slip angle, wherein the controller is configured to calculate the electronic power steering correction as a magnitude reducing factor to steering torque, wherein the magnitude reducing factor is calculated as a function of a difference between the estimated pneumatic trail for the at least one tire of the vehicle and the pneumatic trail threshold, and wherein the controller is configured to estimate slip angle for the at least one tire of the vehicle and, when the tire lateral saturation condition is present, use the estimated slip angle as the target slip angle, wherein the controller controls steering for the vehicle, when the tire lateral saturation condition is present, by applying steering torque in a reduced amount through the electronic power steering system, based on the magnitude reducing factor that is determined based at least in part on a difference between the estimated pneumatic trail and the pneumatic trail threshold.

17. A system for controlling a vehicle, the system comprising:
  a non-transitory computer readable medium comprising computer readable instructions, which when executed by at least one processor, are configured to cause the following steps to be performed:
    reading a plurality of sensors of the vehicle to obtain sensor data;
    estimating a lateral force for at least one tire of the vehicle based on the sensor data;
    estimating a self-aligning torque for the at least one tire based on the sensor data;
    estimating a pneumatic trail for the at least one tire based on a rate of change of the lateral force with respect to the self-aligning torque for the at least one tire;
    determining presence or absence of a tire lateral saturation condition based on a comparison of the estimated pneumatic trail for the at least one tire of the vehicle with a pneumatic trail threshold indicative of a tire lateral saturation condition;
    when the tire lateral saturation condition is present, as determined by the comparison of the estimated pneumatic trail with the pneumatic trail threshold, determining at least one control value; and
    using the at least one control value as an input to a vehicle control module, wherein the vehicle control module is responsive to the tire lateral saturation condition based on the at least one control value; and
    controlling steering for the vehicle based on the at least one control value via the at least one processor, when the tire lateral saturation condition is present, as determined by the comparison of the estimated pneumatic trail with the pneumatic trail threshold.

18. The system of claim 17, wherein the at least one control value comprises an electronic power steering correction and a target slip angle, wherein the instructions, which when executed by the at least one processor, are configured to cause the following steps to be performed:
    calculating the electronic power steering correction as a magnitude reducing factor to steering torque, wherein the magnitude reducing factor is calculated as a function of a difference between the estimated pneumatic trail for the at least one tire of the vehicle and the pneumatic trail threshold;
    estimating slip angle for the at least one tire of the vehicle and, when the tire lateral saturation condition is present, using the estimated slip angle as the target slip angle; and
    controlling steering for the vehicle, when the tire lateral saturation condition is present, by applying steering torque in a reduced amount through the electronic power steering system, based on the magnitude reducing factor that is determined based at least in part on a difference between the estimated pneumatic trail and the pneumatic trail threshold.

* * * * *